May 28, 1940.  H. KÖHLER  2,202,589
ADJUSTABLE SUPPORT FOR ELECTRICAL APPARATUS
Filed Sept. 23, 1937
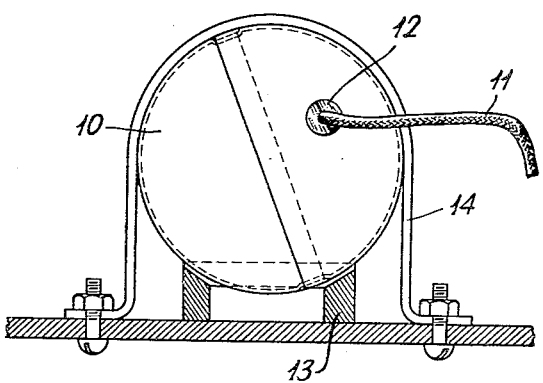
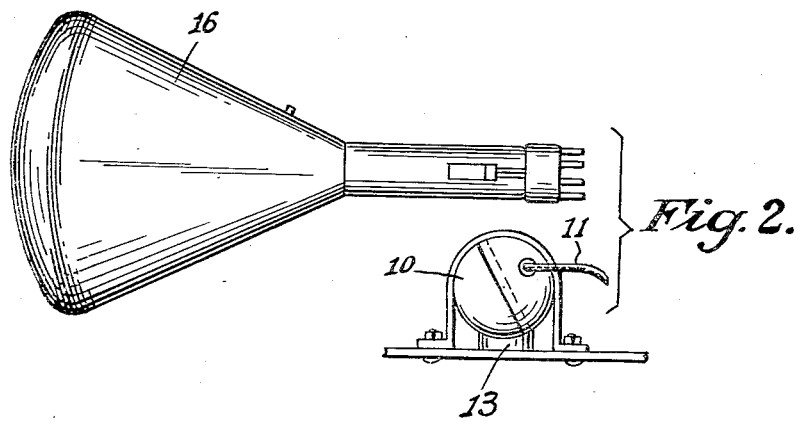
INVENTOR
HELMUT KOHLER
ATTORNEY Patented May 28, 1940

2,202,589

UNITED STATES PATENT OFFICE 2,202,589

ADJUSTABLE SUPPORT FOR ELECTRICAL APPARATUS

Helmut Köhler, Berlin, Germany, assignor to Telefunken Gesellschaft für Drahtlose Telegraphie m. b. H., Berlin, Germany, a corporation of Germany Application September 23, 1937, Serial No. 165,256
In Germany September 5, 1936

2 Claims. (Cl. 250—27)

In electric apparatus of various types the problem often presents itself of arranging within the apparatus a constituent part producing a magnetic stray field, in particular a transformer, such that with respect to other parts of the apparatus the stray field of the transformer remains substantially without detrimental effect. An example of such a case is a television receiver in which a cathode ray tube is used and in which is included a power supply source or battery eliminator. When arranging the transformer of this battery eliminator without regard to its stray field, it can be often observed that the electron beam of the cathode ray tube undergoes a deviation even where the directions of the deviation for the ray are without any current or voltage, said deviation can be traced to the stray field of the transformer. It was already proposed to eliminate this deviation by so arranging the transformer relative to the tube that the direction of the lines of force of the stray field coincides substantially with the tube axis. A similar problem appears in the case of parts of an electric apparatus sensitive to a stray field produced by other parts of the apparatus such as for instance in the case of self inductances. Also these coils must be so adjusted within the apparatus that the lines of force of the stray field extend possibly at right angle to the coil axis.

For such purpose in accordance with the invention the respective part of the apparatus, i. e., in the above examples the transformer and the coil are to be enclosed within a spherical body and the body after having been turned accordingly on its supporting arrangement is to be fixedly secured with respect to the latter.

The invention may be best understood by referring to the drawing, wherein like reference characters represent like parts and wherein:

Figure 1 shows the support for the electromagnetic elements and

Figure 2 shows such an element positioned adjacent an electromagnetic responsive device.

In the drawing, and particularly in Figure 1 thereof, item 10 designates a spherical body consisting preferably of two hemi-spherical cups of equal size which may be formed of metal or of an insulating material, and which enclose the transformer producing a magnetic stray field. The lead-ins to the transformer are contained in a cable 11 entering the spherical body through an opening 12. The wall thickness of the hemispherical cups and the form of the interior space of the sphere is without significance as regards the special problem of adjustment. When making the hemispherical cups of metal, in which case they are preferably pressed from sheet metal, suitable mounting means for the transformer are provided within the spherical body, unless said transformer can be supported simply by the inside of the wall of the sphere. When forming the hemi-spherical cups of insulating material the corresponding fastening or mounting means can be provided during the pressing of the cups. The spherical body 10 is now positioned on the supporting device consisting for instance of a ring 13 shown in cross section in Figure 1 of the drawing, or of three bearing places, such that the stray field of the transformer passes in the desired direction at the desired place of the apparatus. Then by means of a U-shaped clamp 14 the sphere 10 will be screwed tight relative to the ring 13.

In Figure 2 of the drawing is shown an example of the relationship which may exist between the electromagnetic element or transformer and an electromagnetic responsive device such as a cathode ray tube 16. In view of the spherical container 10 and the support 13 and clamp 14, the transformer may be rotated about any axis, and may be clamped in any position or orientation in order that the stray electromagnetic field will have minimum effect upon the electron beam of the cathode ray tube 16 or upon any electromagnetic responsive device adjacent the electromagnetic elements.

Aside from television receivers in which cathode ray tubes are used the invention has special importance for instance to all portable television transmitters containing a cathode ray tube, since in such apparatus the transformers can only be disposed at a greater distance from the cathode ray tube when making the housing of the apparatus excessively large.

What I claim is:

1. In an apparatus wherein an electromagnetic means is positioned adjacent an electromagnetic responsive device comprising a spherical magnetic casing for surrounding the electromagnetic means, support means for said spherical casing permitting rotation of the casing about any axis, and means for clamping said casing in said support means whereby the electromagnetic means may be so positioned to have a minimum effect on the responsive device.

2. In an apparatus wherein an electromagnetic means is positioned relatively adjacent a cathode ray tube comprising a spherical magnetic casing for surrounding the electromagnetic means, means for supporting and for permitting rotation of the casing and electromagnetic means about any axis, and means for securing said casing in said support means whereby the electromagnetic means may be so positioned to have a minimum effect on the electron beam of said cathode ray tube due to the stray field.

HELMUT KÖHLER.